Figure 6:
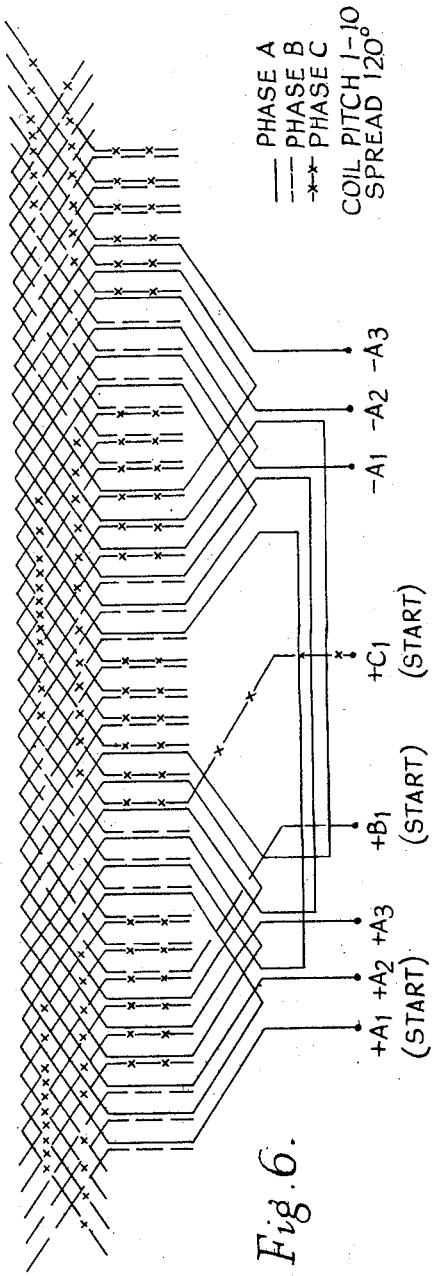

Aug. 4, 1959  G. H. RAWCLIFFE  2,898,534
INDUCTION MOTOR
Filed June 25, 1956  4 Sheets-Sheet 1
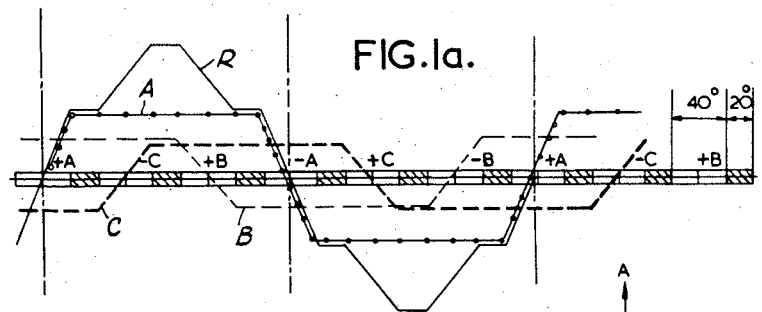
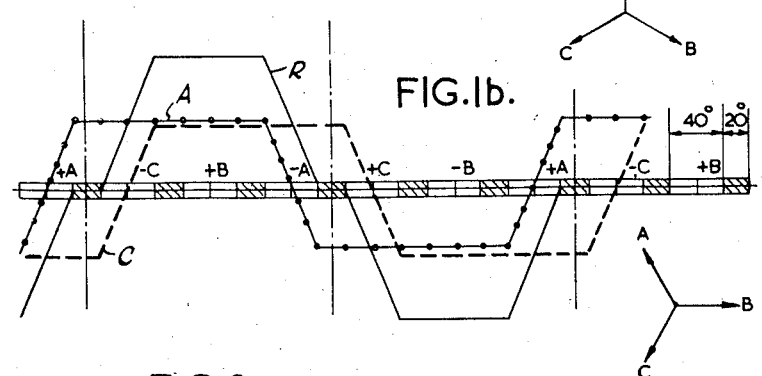
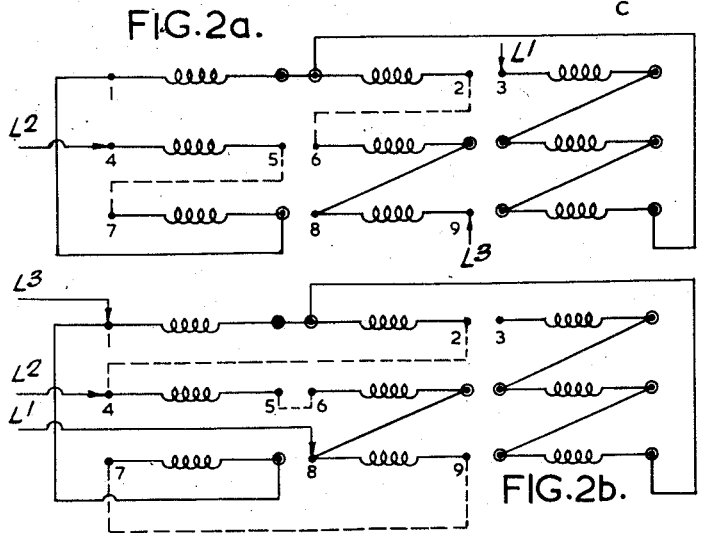
INVENTOR:
GORDON HINDLE RAWCLIFFE
By: Stevens, Davis, Miller & Mosher
Attorneys

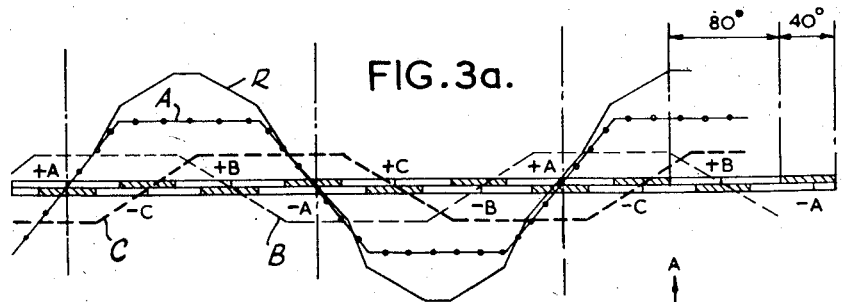
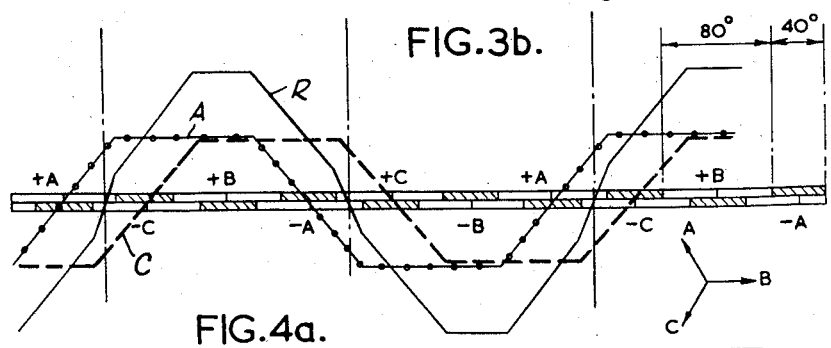
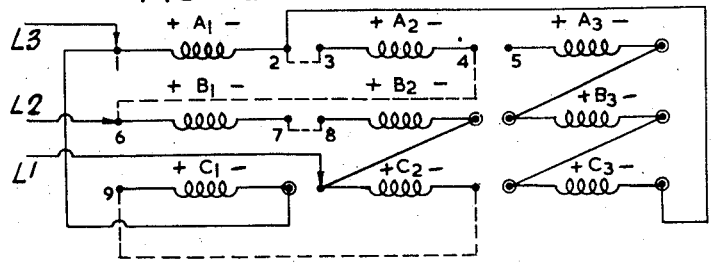
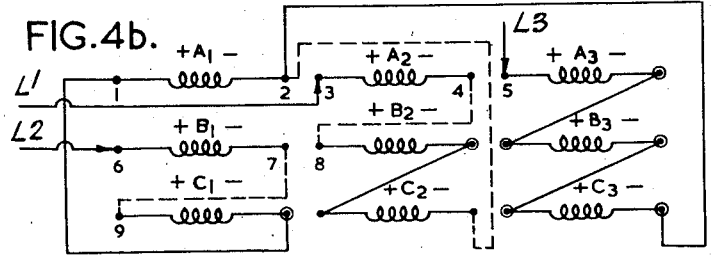

Aug. 4, 1959  G. H. RAWCLIFFE  2,898,534
INDUCTION MOTOR
Filed June 25, 1956  4 Sheets-Sheet 3
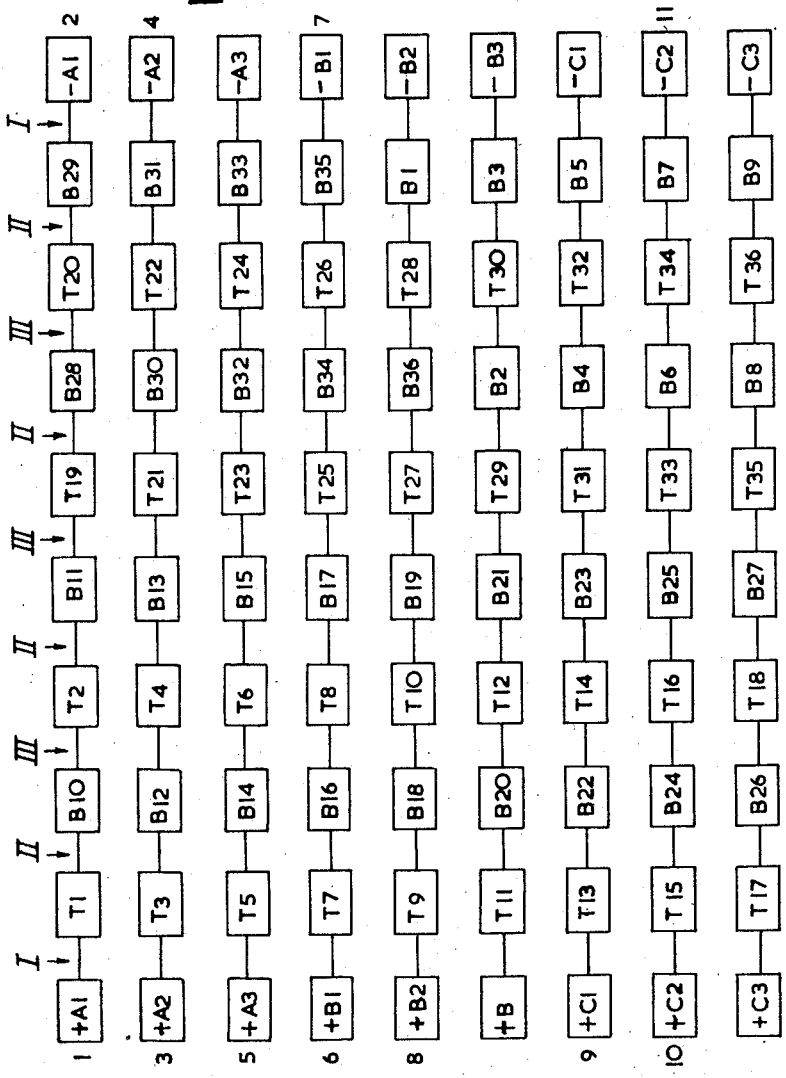
INVENTOR:
GORDON HINDLE RAWCLIFFE

United States Patent Office 2,898,534
Patented Aug. 4, 1959

2,898,534

INDUCTION MOTOR

Gordon Hindle Rawcliffe, Clifton, Bristol, England, assignor to National Research Development Corporation, London, England, a corporation of Great Britain Application June 25, 1956, Serial No. 593,674

Claims priority, application Great Britain June 30, 1955

4 Claims. (Cl. 318—224)

The present invention relates to induction motors and has for its object to provide a three-phase induction motor adapted to run at either of two speeds related in the ratio 3:1.

It is known to provide three-phase motors in which, by changing the connections to the windings, the effective number of poles is changed so that the motor can be made to run at different speeds, but although satisfactory motors are known and widely used for two speeds, related in the ratio 2:1, when attempts have been made to provide for the ratio 3:1 many difficulties have been experienced, not the least of which is to provide a motor which is free from a tendency to "crawl" when connected for one or the other speed. "Crawling" is the operation of the motor when it runs at a sub-multiple of its proper running speed and this condition arises from the harmonic content of the magneto-motive force waveform. The harmonics of the magneto-motive force waveform have the same effect as if the motor were wound with a larger number of poles to which the lower speed corresponds. As is well known, the seventh harmonic is the most important since the third harmonics produced by the three phases tend to neutralise one another while the fifth corresponds to a backwardly rotating field.

One object of the present invention is to provide a new, useful and improved three-phase pole-changing induction motor adapted to run at either of two speeds related in the ratio 3:1.

A further object is to provide such an induction motor with a winding so arranged that the harmonic content, particularly the 7th harmonic content, of the magneto-motive force waveform is kept low and the tendency of the induction motor to "crawl" thereby reduced.

According to the invention a three-phase pole-changing induction motor is provided having three phase-windings each of 120° (electrical degrees) spread and each divisible into three 40° (electrical degrees) sections and adapted to be connected alternatively as a three-phase delta winding or as a three-phase star winding of 120° phase spread, said delta winding being distributed to provide $n$ poles and said star winding distributed to provide $3n$ poles, said delta winding omitting one 40° section of each of said phase windings, the arrangement being such that when connected in delta the machine is adapted to run at substantially three times the speed of said machine when connected in star.

In order that the invention may be readily carried into effect, one motor arrangement will now be described by way of explanation and a further motor arrangement will be described by way of example with reference to the drawings accompanying the provisional specification, of which:

Figs. 1($a$) and 1($b$) are diagrams showing the winding distribution of an experimental motor;

Figs. 2($a$) and 2($b$) are circuit diagrams showing the coil inter-connections used in the motor of Figs. 1($a$) and 1($b$);

Figs. 3($a$) and 3($b$) are diagrams showing the winding distribution of a motor according to the invention;

Figs. 4($a$) and 4($b$) are circuit diagrams showing coil inter-connections used in the motor of Figs. 3($a$) and 3($b$);

Fig. 5 is a complete winding diagram for the motor of Figs. 3($a$) and 3($b$); and Fig. 6 is a further winding diagram corresponding to the diagram of Fig. 5 and showing the slot positions of the coil sides.

Figures 1$a$, 1$b$ and Figures 3$a$, 3$b$ further show the M.M.F. waveform for each of the three phase windings, indicated at A, B and C, and the resultant thereof indicated at R. The convention followed in these diagrams is that in Figures 1$a$, 3$a$ the phase current relationships are as shown in the vector diagram, phase A being a maximum ($I_{max}$) at this instant and phases B and C being equal to $-I_{max} \sin 30°$, that is $\frac{1}{2} I_{max}$. In Figures 1$b$, 3$b$, the vectors are rotated through 30° so that, at this instant, A and C are equal in amplitude, that is $I_{max} \sin 60°$ and B is zero.

In order to provide a motor winding, with pole-changing facilities which would give two speeds of operation related 3:1, one expedient is to wind the motor with a three-phase winding suitable for connection in delta to provide two-pole three-phase operation, but with the three-phase windings each divided into three sections each having their end connections brought out so as to be available for pole-changing by varying the inter-connections between the coils. With the coils connected so as to form a normal three-phase delta two-pole winding the motor may then be made to run at what may be regarded as its normal speed. By re-connecting the coils the motor can be arranged to have, in effect, three times the number of poles so as to run at one-third the normal speed. There are various ways in which this may be done and it has been found that, unless special measures are adopted as hereinafter set forth, there is liable to be a serious loss of efficiency at one speed or the other or a tendency to "crawl," or both of these defects, which will make the motor unattractive as a practical proposition.

For example, one form of winding which was tried was of the form illustrated in Figs. 1($a$) and 1($b$) of the drawings which shows in diagrammatic form the winding distribution employed and the magneto-motive force waveform for two different current vector positions. The winding in this example is a double-layer full-pitch three-phase winding of 60° spread, and it has been shown with each phase divided into three phase bands, each of 20° phase spread. In these diagrams the respective vector positions are shown inset and the component magneto-motive force waveforms for the three phases A, B and C are shown correspondingly marked while the resultant waveform is shown at R. The hatched rectangles show parts of the winding not used at the higher speed. Against the windings the phases to which they correspond have been marked with the same reference letters which have been placed as nearly as possible over the centre section of each phase band and the positive and negative signs indicate the "go" and "return" runs on the conductors respectively. For operation at low speed all the windings were used, connected as shown in Fig. 2($a$) to form in effect three six-pole single-phase windings each of 60° spread, or effectively a six-pole three-phase winding.

In order to operate the machine at its higher speed (three times the low speed) the windings were connected as shown in Fig. 2($b$), that is to say, with one-third of each winding omitted. This reduction in the number of conductors was introduced for the purpose of increasing the flux at the higher speed. The coils omitted were chosen so as to leave a 20° gap at the end of each phase band as shown in Figs. 1(a) and 1(b) and the remaining coils were connected as a nominally 60° spread, full pitch, double-layer, three-phase winding, apart from the 20° gaps, which had the effect that only 40° of the spread was in use. In Figs. 2(a) and 2(b) the dotted line connections show the external connections changed by the speed control switch.

With this arrangement, a pole-changing motor was produced which operated satisfactorily at two speeds related 3:1. However, when connected for the higher speed, the motor "crawled" badly at one seventh speed, on voltages below half-voltage and although raising the voltage brought the motor to full speed on no load there was an undesirable dip in the speed/torque curve. In industrial practice this arrangement would be of little value.

As has been stated, the "crawling" tendency is due to the harmonic content of the magneto-motive force waveform. Now the magneto-motive force waveform is affected not only by the distribution of the windings but also by the permeance distribution of the frame which is divided up by the slots in which the windings are housed. It is not unreasonable to suppose that the effect of this permeance distribution on the magneto-motive force waveform could operate either to increase or decrease the percentage of the total flux present in any given harmonic and the realisation of this fact has been employed in devising the motor according to the present invention.

In the 3:1 pole-changing motor above described with reference to Figs. 1(a), 1(b), 2(a) and 2(b) the magneto-motive force waveform R on Figs. 1(a) and 1(b) demonstrates a seventh harmonic content of 3.8% of the fundamental. This is less than double the magnitude of the seventh harmonic in every standard three-phase winding and it seemed surprising that in these circumstances there should be so considerable a tendency to "crawl." It fell to be considered, therefore, whether the slot permeance distribution was imposing a flux harmonic of a much higher relative magnitude than the magneto-motive force harmonic indicated. As there were nine slots per pole, the normal crawling harmonics would be of the 17th and 19th orders ($m = 2S \pm 1$: where $S$ = total slots per pole = 3, 6, 9 etc.,); but the nine slots per pole were, in effect, divided into three slot-groups each of three slots by the slot containing the conductors which were switched out of circuit. It therefore seemed reasonable to suppose that the permeance harmonics might be, in this case, not slot harmonics but slot-group harmonics. These slot-group harmonics would naturally be of the fifth and seventh orders, and would account for any magneto-motive force harmonics of these orders being more pronounced, relatively, in the flux wave.

With these considerations in mind the motor according to the present invention was devised. Figs. 3(a) and 3(b) of the drawings show the layout of one form of winding according to the invention, with magneto-motive force waveforms for two vector positions, as connected for the higher of the two speeds related 3:1 for which the motor was designed. Figs. 4(a) and 4(b) show the coil interconnections used for the higher speed and the lower speed respectively. In these figures the same reference convention has been used as for Figs. 1(a), 1(b), 2(a) and 2(b).

The winding employed is a double-layer, full pitch three-phase winding and departs from standard practice in that it is wound with 120° phase spread. Each phase is divided into three parts and the terminals marked 1 to 11 in Figs. 4(a) and 4(b) are brought out to leads for connection to a pole-changing switch. When the coils are connected as in Fig. 4(a) the winding becomes a delta-connected three-phase winding of nominally 120° spread, only 80° of which is used, the three coils $A_3$, $B_3$ and $C_3$ being left unconnected. As will be seen from Figs. 3(a) and 3(b) these coils represent a 40° gap at the end of each phase band. For operation at the lower speed, that is one-third of the higher speed, the winding is connected as shown in Fig. 4(b) from which it will be seen that the winding is star-connected as a 120° spread three-phase winding, with three times the number of poles as at the higher speed.

An actual winding diagram is shown in Fig. 5. This diagram relates to a machine built on a standard four-pole frame with 36 stator slots. In this diagram the references $T_1$, $T_2$ . . . etc., indicate the top layers in the correspondingly numbered slots of the frame while references $B_1$, $B_2$ . . . etc., indicate the bottom layers in the corresponding slots. The letterings $A_1$, $-A_1$ . . . etc., indicate the sections of the various phase windings corresponding to the diagrams of Figs. 3(a) and 3(b). The vertical columns labelled I indicate coil end connections, II indicate coil throw and III connections between coil sections. The winding comprises 36 coils of full pitch connected into nine sets each of four coils and the numerals 1 to 11 indicate the leads brought out to terminals similarly numbered on Figs. 4(a) and 4(b). Fig. 6 shows the double layer winding in the familiar developed form showing the relative slot positions of the coil sides numbered in sequence from an arbitrary origin. The right hand coil side forms the lower layer. The winding of phase A is shown in full. Phases B and C are identical with A, but are displaced by 6 and 12 slots respectively. Six leads per phase are taken out initially, e.g. $+A_1$, $+A_2$, $+A_3$, $-A_1$, $-A_2$, $-A_3$. These leads are joined and combined to give eleven control leads numbers 1 to 11 respectively, as follows:

1. $+A_1$ and $-C_1$
2. $-A_1$ and $-C_3$
3. $+A_2$
4. $-A_2$
5. $+A_3$
6. $+B_1$
7. $-B_1$
8. $+B_2$
9. $+C_1$
10. $-B_2$ and $+C_2$
11. $-C_2$ Join $-A_3$ and $+B_3$
$-B_3$ and $+C_3$ The inter-connections may be effected by means of a seven-gang double-throw switch providing two forms of interconnection for operation of the machine as either a 12-pole or a 4-pole machine.

The rotor may be a conventional squirrel-cage rotor with slots skewed by about one stator slot pitch. If a wound rotor is desired this may be provided and if it is only desired to introduce rotor resistance for operation of the motor with the larger number of poles this may be done with three slip-rings. For this purpose the rotor can be wound 2-phase, with six phase bands connected into two groups of three in parallel, the three bands in each group being spaced $$\left(\frac{2\pi}{3}\right)$$

with respect to a 4-pole field and $2\pi$ with respect to a 12-pole field. With respect to 4-poles each group is short circuited on itself: with respect to 12-poles each group generates a terminal voltage, and the two groups are spaced $$\frac{\pi}{2}$$

and act as a 2-phase rotor.

A motor wound in the manner above described and provided with a squirrel-cage rotor was found to be free from any crawling tendency and gave the following continuous ratings and performances:

(a) 440 volt 3 phase 50 c./s. 4-pole delta-connected 4.5 H.P., 1450 r.p.m., P.F. 0.87, efficiency = 84%.

(b) 440 volt 3 phase 50 c./s. 12-pole star-connected 0.8 H.P., 480 r.p.m., P.F. 0.62, efficiency=60%.

The fan fitted was of a small size, suited for the machine at 1500 r.p.m., and the general proportions of the machine corresponded more to this speed than to the usual 12-pole form. A larger fan, and a bigger ratio of diameter to length would almost certainly increase the relative rating at the lower speed. Further, the copper loss at the lower speed could have been reduced considerably by winding one-third of the coils of pitch 1-4, which would be appropriate for the lower speed, instead of 1-10, since these coils would be left unconnected for the higher speed.

(c) Torque from short circuit tests

The usual short circuit tests were performed, and on this basis the pull-out power was deduced in the normal manner.

4-pole
Pull out power=7.2 H.P. } Ratio 1.6.
Full load power=4.5 H.P. }

12-pole
Pull out power=1.66 H.P. } Ratio 2.1.
Full load power=0.8 H.P. }

Clearly other forms of winding may be used. For example, the 40° of winding left unconnected in the high speed condition may be the 40° section at the middle of each phase band although it has been found that with such an arrangement there is a tendency to "crawl" at a speed related to the thirteenth harmonic of the magneto-motive force waveform.

In general it is to be noted that freedom from a tendency to "crawl" must depend not only upon the harmonic content of the magneto-motive force waveform but also upon the permeance distribution which may be arranged to reduce or increase the effect of given harmonics. The fact that the same machine tested first connected as in Figs. 1(a) and 1(b) and then connected as in Figs. 3(a), 3(b) gave incomparably better performance in the latter case, is taken as a clear indication of this contention.

I claim:

1. A three-phase pole-changing induction motor having three phase windings each of 120° spread and each divisible into three 40° sections and adapted to be connected alternatively as a three-phase delta winding or as a three-phase star-winding of 120° phase spread, said delta winding being distributed to provide n poles and said star winding distributed to provide 3n poles, said delta widing omitting one 40° section of each of said phase windings, the arrangement being such that when connected in delta the machine is adapted to run at substantially three times the speed of said machine when connected in star.

2. A three-phase pole-changing induction motor as claimed in claim 1, in which the sections of each of said phase windings omitted when the machine is connected in delta represent a 40° gap at the end of each phase band.

3. A three-phase pole-changing induction motor as claimed in claim 1, in which the said winding is double wound, each 40° section omitted when the machine is connected in delt being wound to occupy one half of each of two adjacent slots, the remaining half of each slot being occupied by half a 40° section forming a part of the other two phase windings.

4. In a three-phase pole-changing induction motor, a first group of windings comprising first, second and third sections each of 40° spread, a second group of windings comprising fourth, fifth and sixth sections each of 40° spread, a third group of windings comprising seventh, eighth and ninth sections each of 40° spread, conductive connecting means between the beginning of said first section and the end of said seventh section, between the end of said third section and the beginning of said sixth section, between the end of said fifth section and the beginning of said eighth section and between the end of said sixth section and the beginning of said ninth secction, two position switching means having a first position wherein conductive connections are established from the end of said first section to the beginning of said second section, from the end of said second section to the beginning of said fourth section, from the end of said fourth section to the beginning of said fifth section, and from the begining of said seventh section to the end of said eighth section and for the connection of the first phase conductor of a three-phase supply to the beginning of said eighth section, the second phase conductor of the said supply to the beginning of said fourth section and the third phase conductor of the said supply to the beginning of said first section and having a second position wherein conductive connections are established from the end of said first section to the end of said eighth section, from the end of said second section to the beginning of said fifth section, and from the end of said fourth section to the beginning of said seventh section and for the connection of the first phase conductor of said three-phase supply to the beginning of said second section, the second phase conductor of the said supply to the beginning of said fourth section and the third phase conductor of the said supply to the beginning of said third section, each of said sections being of 40° spread.

References Cited in the file of this patent

UNITED STATES PATENTS

| | | |
|---|---|---|
| 1,610,455 | Lewis | Dec. 14, 1926 |
| 2,820,938 | Davies | Jan. 21, 1958 |

FOREIGN PATENTS

| | | |
|---|---|---|
| 579,400 | Great Britain | Aug. 1, 1946 |